United States Patent
Epstein

(10) Patent No.: US 9,957,823 B2
(45) Date of Patent: May 1, 2018

(54) VIRTUAL MULTI-STREAM GAS TURBINE ENGINE

(71) Applicant: United Technologies Corporation, Hartford, CT (US)

(72) Inventor: Alan H. Epstein, Lexington, MA (US)

(73) Assignee: United Technologies Corporation, Farmington, CT (US)

(*) Notice: Subject to any disclaimer, the term of this patent is extended or adjusted under 35 U.S.C. 154(b) by 599 days.

(21) Appl. No.: 14/604,228

(22) Filed: Jan. 23, 2015

(65) Prior Publication Data

US 2015/0361819 A1 Dec. 17, 2015

Related U.S. Application Data

(60) Provisional application No. 61/931,164, filed on Jan. 24, 2014.

(51) Int. Cl.
| | |
|---|---|
| *F01D 1/02* | (2006.01) |
| *F01D 5/22* | (2006.01) |
| *F01D 9/04* | (2006.01) |
| *F01D 17/16* | (2006.01) |
| *F02C 9/20* | (2006.01) |
| *F02K 3/075* | (2006.01) |
| *F02K 3/077* | (2006.01) |
| *F04D 29/56* | (2006.01) |
| *F01D 5/14* | (2006.01) |

(52) U.S. Cl.
CPC ............. *F01D 9/041* (2013.01); *F01D 1/023* (2013.01); *F01D 5/225* (2013.01); *F01D 17/162* (2013.01); *F02C 9/20* (2013.01); *F02K 3/075* (2013.01); *F02K 3/077* (2013.01); *F04D 29/563* (2013.01); *F01D 5/148* (2013.01); *Y02T 50/673* (2013.01)

(58) Field of Classification Search
CPC .......... F01D 1/023; F01D 5/225; F01D 9/041; F01D 17/14; F01D 17/16; F01D 17/162; F02C 9/20; F02K 3/077; F02K 3/075; F04D 29/563

See application file for complete search history.

(56) References Cited

U.S. PATENT DOCUMENTS

| | | | | |
|---|---|---|---|---|
| 3,418,808 A | * | 12/1968 | Rich | F02C 7/18 415/79 |
| 3,806,067 A | * | 4/1974 | Kutney | F02K 1/78 123/41.7 |
| 4,043,121 A | * | 8/1977 | Thomas | F02K 3/075 415/78 |

(Continued)

*Primary Examiner* — Jason Shanske
*Assistant Examiner* — Christopher R Legendre
(74) *Attorney, Agent, or Firm* — O'Shea Getz P.C.

(57) ABSTRACT

A gas turbine engine is provided that includes a core flow path to direct a core stream flow. A common flow path is outboard of the core flow path, where the common flow path directs both a second stream flow and a third stream flow. Another gas turbine engine is provided that includes an outer case structure around a central longitudinal engine axis. An intermediate case structure is inboard of the outer case structure, where the intermediate case structure and the outer case structure direct both a third stream flow and a second stream flow. An inner case structure is inboard of the intermediate case structure, where the inner case structure and the intermediate case structure direct a core stream flow.

17 Claims, 12 Drawing Sheets

(56) References Cited

U.S. PATENT DOCUMENTS

| | | | |
|---|---|---|---|
| 4,175,384 A * | 11/1979 | Wagenknecht | F02K 3/075 60/226.3 |
| 4,696,159 A | 9/1987 | Horgan | |
| 4,995,786 A * | 2/1991 | Wheeler | F01D 5/141 415/148 |
| 5,201,801 A * | 4/1993 | Smith, Jr. | F02C 7/05 60/226.1 |
| 5,281,087 A * | 1/1994 | Hines | F01D 17/162 415/160 |
| 7,614,210 B2 * | 11/2009 | Powell | F02K 1/08 60/226.1 |
| 7,758,303 B1 * | 7/2010 | Wadia | F01D 5/022 415/77 |
| 7,788,899 B2 | 9/2010 | Smith | |
| 8,176,725 B2 * | 5/2012 | Norris | F02C 3/107 60/226.1 |
| 8,356,483 B2 | 1/2013 | Petty et al. | |
| 8,371,806 B2 | 2/2013 | Kupratis | |
| 8,402,742 B2 | 3/2013 | Roberge et al. | |
| 8,590,286 B2 | 11/2013 | Roberge et al. | |
| 8,739,548 B2 | 6/2014 | Petty | |
| 8,935,923 B2 | 1/2015 | Kupratis | |
| 9,157,366 B2 * | 10/2015 | Kupratis | F02C 3/06 |
| 2014/0064955 A1 * | 3/2014 | Senter | F01D 9/042 415/209.3 |
| 2014/0260180 A1 | 9/2014 | Kupratis et al. | |
| 2014/0338357 A1 | 11/2014 | Lovett et al. | |
| 2015/0361819 A1 * | 12/2015 | Epstein | F01D 9/041 415/1 |

* cited by examiner

VIRTUAL MULTI-STREAM GAS TURBINE ENGINE

CROSS-REFERENCE TO RELATED APPLICATION

This application claims priority to U.S. Provisional Patent Application No. 61/931,164 filed Jan. 24, 2014, which is hereby incorporated herein by reference in its entirety.

BACKGROUND

The present disclosure relates to variable cycle gas turbine engines, and more particularly to a span-adaptive stator therefore.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Most turbofan engines split the airflow into two streams downstream of a fan. An inner stream enters the core, there to undergo further compression, mix with fuel, burn, and then generate mechanical shaft power by passage through a turbine. This core stream may then exit through a nozzle. The outer stream bypasses the core either to exit the engine through its own separate nozzle or is mixed into the core stream before exit through a common nozzle.

More recently, variable cycle gas turbine engines, or so called three-stream architectures have been proposed in which in addition to the inner core stream, the outer stream may be split into two or more additional streams in separate ducts. There may be additional turbomachinery stages deployed amongst the streams in various architectures. Typically, the outer stream is so split in order that the total temperature and total pressure of the two outer streams may differ according to mission needs.

These three-stream engine architectures can result in increased overall aircraft performance for some missions, especially those with widely varying requirements such as supercruise and loiter. In some applications, however, the penalties in complexity and weight associated with conventional three-stream architectures may negate the benefits.

SUMMARY

A gas turbine engine, according to one disclosed non-limiting embodiment of the present disclosure, includes a core flow path to direct a core stream flow. A common flow path is outboard of the core flow path. The common flow path directs both a second stream flow and a third stream flow.

In a further embodiment of the present disclosure, the third stream flow and the second stream flow each operate at a different total temperature and total pressure, relative velocity and about equivalent static pressure.

In a further embodiment of any of the foregoing embodiments of the present disclosure, the third stream flow and the second stream flow each operate at about equivalent static pressure.

In a further embodiment of any of the foregoing embodiments of the present disclosure, the third stream flow and the second stream flow each operate at a different relative swirl.

In a further embodiment of any of the foregoing embodiments of the present disclosure, a vane array is included with a multiple of span adaptive stators within the second stream flow and the third stream flow. Each of the span adaptive stators includes a first spanwise segment and a second spanwise segment each individually rotatable about an axis.

In a further embodiment of any of the foregoing embodiments of the present disclosure, a vane array is included with a multiple of span adaptive stators operable to separately control the second stream flow and the third stream flow. Each of the span adaptive stators includes a first spanwise segment and a second spanwise segment each with a trailing edge flap rotatable about an axis.

In a further embodiment of any of the foregoing embodiments of the present disclosure, a vane array is included with a multiple of span adaptive stators operable to separately control the second stream flow and the third stream flow. Each of the span adaptive stators includes a first spanwise segment and a second spanwise segment each with a leading edge flap rotatable about an axis.

In a further embodiment of any of the foregoing embodiments of the present disclosure, a vane array is included with a multiple of span adaptive stators operable to separately control the second stream flow and the third stream flow. Each of the span adaptive stators includes a first spanwise segment and a second spanwise segment each with a leading edge flap rotatable about an axis and a trailing edge flap rotatable about an axis.

In a further embodiment of any of the foregoing embodiments of the present disclosure, a vane array is included with a multiple of span adaptive stators operable to separately control the second stream flow and the third stream flow. Each of the span adaptive stators includes a circumferential partial span shroud to at least partially define co-annular passageways between the second stream flow and the third stream flow.

In a further embodiment of any of the foregoing embodiments of the present disclosure, a rotor disk is included with a multiple of rotor blades. Each of the multiple of rotor blades includes a circumferential partial span blade shroud radially aligned with the circumferential partial span shroud.

A gas turbine engine, according to another disclosed non-limiting embodiment of the present disclosure, includes an outer case structure around a central longitudinal engine axis. An intermediate case structure is included inboard of the outer case structure, where the intermediate case structure and the outer case structure direct both a third stream flow and a second stream flow. An inner case structure is included inboard of the intermediate case structure, where the inner case structure and the intermediate case structure direct a core stream flow.

In a further embodiment of any of the foregoing embodiments of the present disclosure, a vane array is included with a multiple of span adaptive stators operable to separately control the second stream flow and the third stream flow.

In a further embodiment of any of the foregoing embodiments of the present disclosure, the multiple of span adaptive stators are upstream of a common flow path at least partially formed between the outer case structure and the intermediate case structure. The common flow path receives both the third stream flow and the second stream flow.

In a further embodiment of any of the foregoing embodiments of the present disclosure, the inner case structure and the intermediate case structure at least partially form a core flow path inboard of the common flow path. The core flow path receives the core stream flow.

A method of operating a gas turbine engine, according to another disclosed non-limiting embodiment of the present disclosure, includes directing both a third stream flow and a second stream flow from a fan section into a common flow path radially outboard of a core flow path.

In a further embodiment of any of the foregoing embodiments of the present disclosure, the method includes at least partially forming the third stream flow and a second stream flow with a multiple of span adaptive stators of a vane array within the fan section.

In a further embodiment of any of the foregoing embodiments of the present disclosure, the method includes at least partially segregating the third stream flow and the second stream flow with a circumferential partial span shroud that extends from the multiple of span adaptive stators.

In a further embodiment of any of the foregoing embodiments of the present disclosure, the method includes at least partially segregating the third stream flow and the second stream flow with a circumferential partial span blade shroud that extends from each of a multiple of rotor blades upstream of the circumferential partial span shroud. The circumferential partial span blade shroud is radially aligned with the circumferential partial span shroud.

In a further embodiment of any of the foregoing embodiments of the present disclosure, the method includes at least partially forming the third stream flow and a second stream flow by morphing one or more of a multiple of span adaptive stators of a vane array within the fan section.

In a further embodiment of any of the foregoing embodiments of the present disclosure, the third stream flow and the second stream flow operate at a different total temperature, total pressure, relative velocity and an about equivalent static pressure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment(s). The drawings that accompany the detailed description can be briefly described as follows.

DETAILED DESCRIPTION

Figure 1:
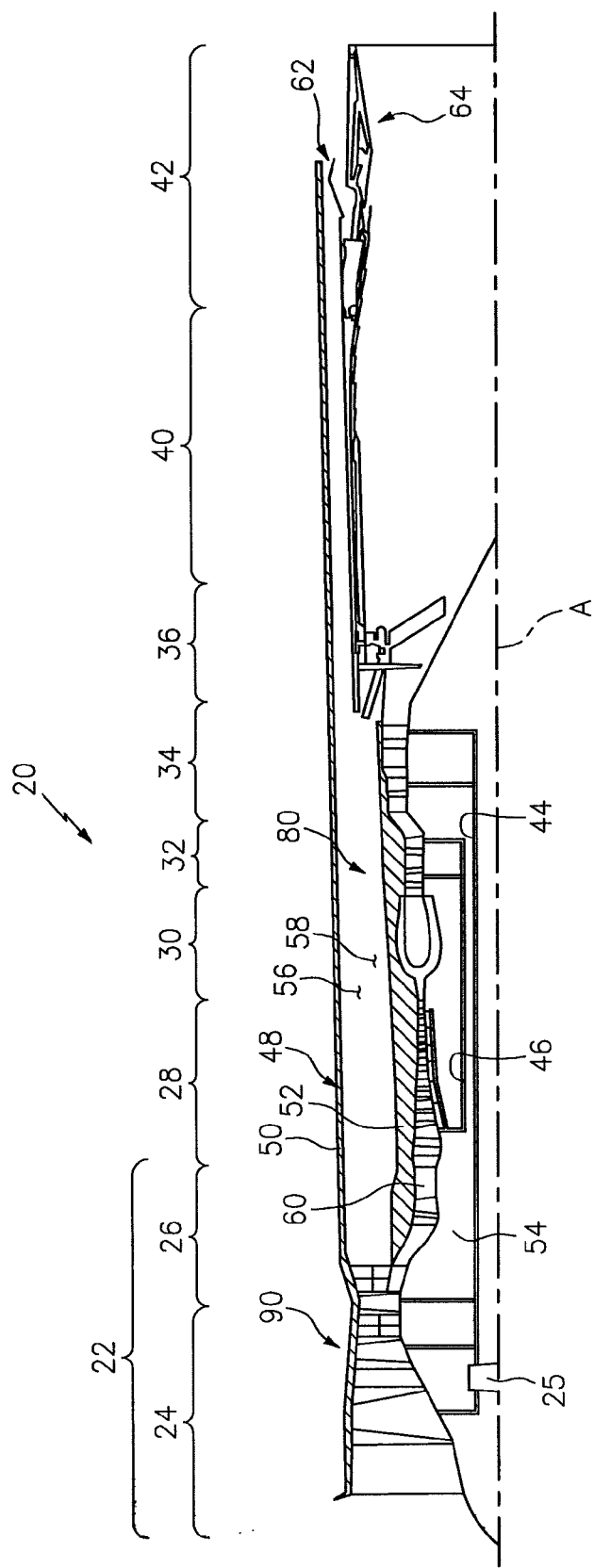
FIG. 1 is a general sectional schematic view of an example variable cycle gas turbine engine.

FIG. 1 schematically illustrates a gas turbine engine 20. The gas turbine engine 20 is disclosed herein as a variable cycle two-spool turbofan that generally includes: a fan section 22 with a first fan section 24 and a second fan section 26; a high pressure compressor section 28; a combustor section 30; a high pressure turbine section 32; a low pressure turbine section 34; an augmentor section 36 & 40; and a nozzle section 42. The sections are defined along a central longitudinal engine axis A about which a low spool 44 and a high spool 46 rotate relative to an engine case structure 48. Although particular engine architectures are illustrated in the various disclosed non-limiting embodiment, other architectures such as three-spool architectures, will also benefit herefrom with additional or alternative sections, systems, and/or features such as a geared architecture 25.

The engine case structure 48 generally includes an outer case structure 50, an intermediate case structure 52 and an inner case structure 54. It should be appreciated that case structures of various unitary or assembled constructions, may form the case structures 48 to essentially define an exoskeleton that supports the spools 44, 46 for rotation therein.

Figure 2:
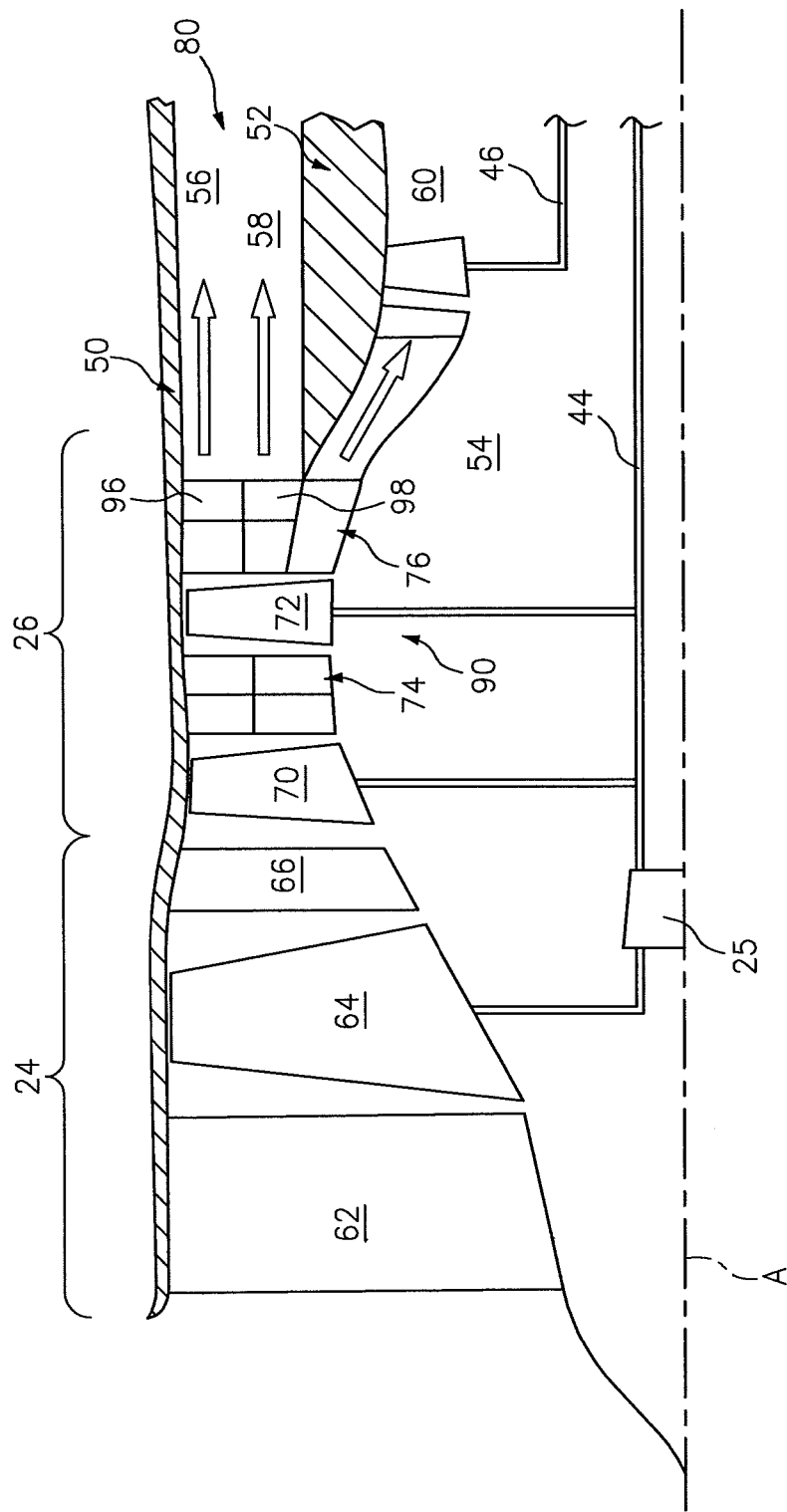
FIG. 2 is an expanded general schematic sectional view of a fan section with span adaptive stators according to one non-limiting embodiment.

With reference to FIG. 2, the first fan section 24 communicates airflow into a third stream flow path 56, a second stream flow path 58 and a first stream core flow path 60 that is in communication with the combustor section 30. It should be appreciated that although three flow streams are disclosed, additional flow streams may be provided and benefit herefrom. The first fan section 24, in this disclosed non-limiting embodiment, includes an upstream inlet guide vane 62, a fan rotor 64 and a downstream vane array 66. The first fan section 24 may alternatively or additionally include other architectures that, for example, include additional or fewer stages each with or without various combinations of variable or fixed guide vanes.

The second fan section 26 further compresses the airflow from the first fan section 24 for communication into the third stream flow path 56, the second stream flow path 58 and the core flow path 60. The second fan section 26 may include a multiple of fan rotors 70, 72 and associated rotationally stationary vane arrays 74, 76. The second fan section 26 may alternatively or additionally include other architectures that, for example, include additional or fewer stages each with or without various combinations of variable or fixed guide vanes.

The core stream flow of the core flow path 60 is compressed by the first fan section 24, the second fan section 26, the high pressure compressor section 28, mixed and burned with fuel in the combustor section 30, then expanded over the high pressure turbine section 32 and the low pressure turbine section 34 to rotationally drive the respective low spool 44 and high spool 46 in response to the expansion. Each of the turbine sections 32, 34 may alternatively or additionally include other architectures that, for example, include additional or fewer stages each with or without various combinations of variable or fixed guide vanes.

The third stream flow path 56 and the second stream flow path 58 are generally defined by the outer case structure 50 and the intermediate case structure 52. The core flow path 60 is generally defined by the intermediate case structure 52 and the inner case structure 54 radially inward of the second stream flow path 58 and the third stream flow path 56. The second stream flow path 58 is radially inward of the third stream flow path 56 and together form a common flow path 80 defined by the outer case structure 50 and the intermediate case structure 52. That is, no structure is defined within the common flow path 80 between the outer case structure 50 and the intermediate case structure 52 but the common flow path contains and directs two separate streams, each of which may have different flow characteristics such as total temperature, total pressure, swirl and velocity. Although a relatively abrupt spanwise change in stator geometry is illustrated in the disclosed non-limiting embodiments, this should not be construed to imply that the virtual boundary between the second and third streams need be abrupt. In other words, there may alternatively or additionally be a transition region in flow properties between the second stream and the third stream within the common flow path 80.

For the total pressure and total temperatures to be different, then the swirl added by the rotor(s) must be different for the multiple streams. This difference can be increased when the swirl entering the rotor is different for the multiple streams which implies that a preferred configuration have span adaptive stators 90 before and after a stage. The principle intent is to prove two or more streams 56, 58 of differing total temperature and total pressure, without the penalties of an intervening wall which implies certain constraints on the velocities of the two streams (axial and circumferential). The differences in velocity and swirl between the streams are a result of this design innovation rather than the intent.

Figure 3:
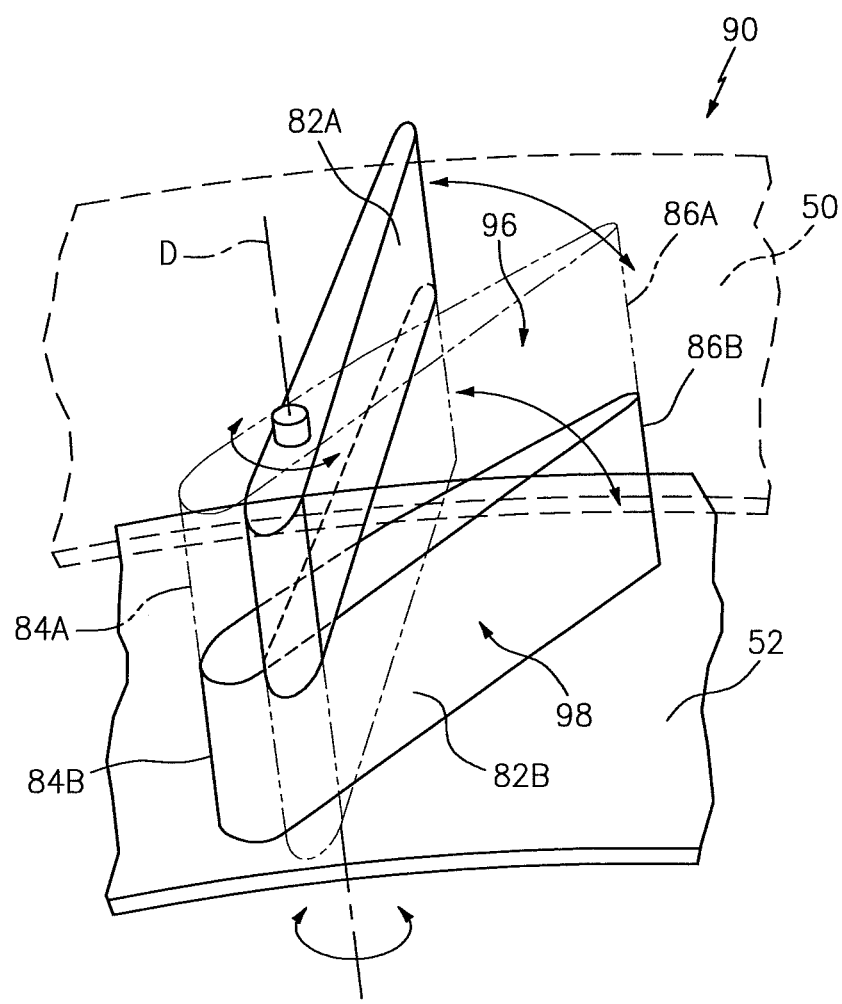
FIG. 3 is an expanded general schematic sectional view of a span adaptive stator according to another non-limiting embodiment.

In one disclosed non-limiting embodiment, the most downstream stationary vane array 76 within the second fan section 26 that is immediately upstream of the intermediate case structure 52 that separates the common flow path 80 from the core flow path 60 includes a multiple of span adaptive stators 90 (also shown in FIG. 3). It should be appreciated that the multiple of span adaptive stators 90 may include, but not be limited to, every stator within the vane array 76. Each span adaptive stator 90 includes two or more spanwise segments 96, 98 (two shown) that are, in one disclosed non-limiting embodiment, separately rotatable about an axis of rotation D. Each spanwise segment 96, 98 is associated with a respective stream such as a third stream along the third stream flow path 56 and a second stream along the second stream flow path 58. It should be appreciated that additional spanwise segments for engines with additional streams will also benefit herefrom and that various airfoil and non-airfoil shapes may be utilized.

Figure 4:
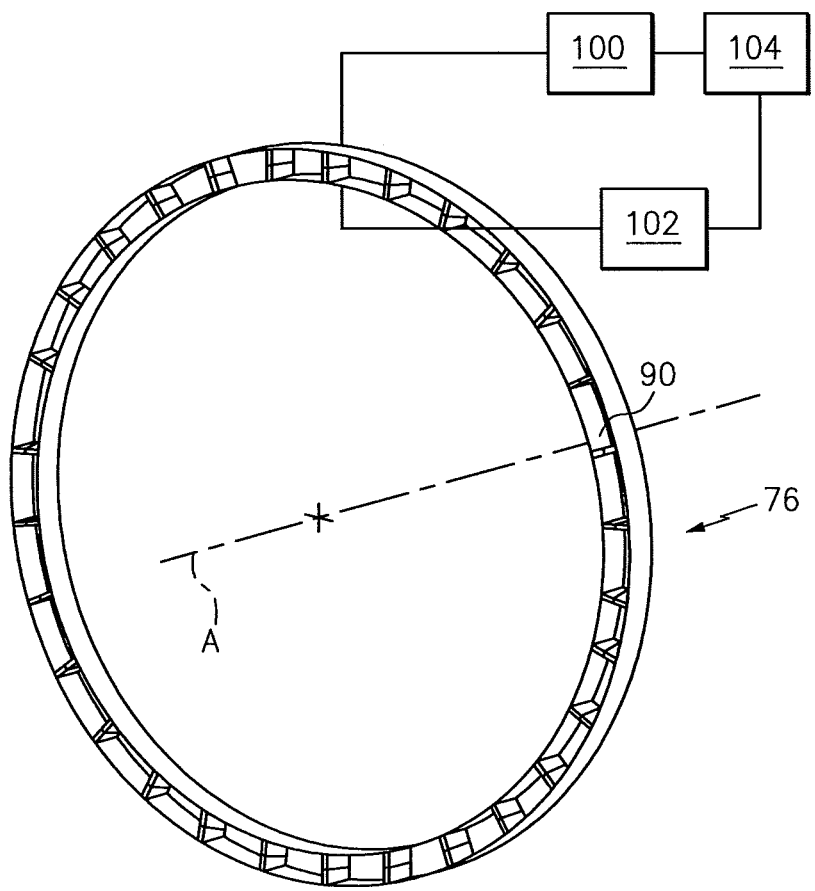
FIG. 4 is an expanded general schematic sectional view of a fan section vane array with span adaptive stators according to another non-limiting embodiment.

With reference to FIG. 3, in one disclosed non-limiting embodiment, each segment 96, 98 of a span adaptive stator 90A is defined by an outer wall surface 82A, 82B between a leading edge 84A, 84B and a trailing edge 86A, 86B. The spanwise segments 96, 98 in this disclosed non-limiting embodiment are individually rotatable about an axis D by a respective actuator 100, 102 in response to a control 104 (illustrated schematically; FIG. 4). It should be recognized that arrangements other than that illustrated are possible that, for example, permit each segment 96, 98 to have its own axis D, which need not be coincident.

The respective spanwise segments 96, 98 of the vane array 76 can be actuated individually, or ganged together by one of several mechanisms. The spanwise segments 96, 98 are thereby operable to selectively generate and modulate the individual flow characteristics of the third stream and second stream being directed into the common flow path 80.

The control 104 generally includes a control module that executes airflow control logic to facilitate operation of the engine at various cycle points. The control 104 typically includes a processor, a memory, and an interface. The processor may be any type of known microprocessor having desired performance characteristics. The memory may be any computer readable medium that stores data and control algorithms such as logic that effectuates the operations described herein. The interface facilitates communication with other components such as the actuators 100, 102. In one non-limiting embodiment, the control module may be a portion of a flight control computer, a portion of a Full Authority Digital Engine Control (FADEC), a stand-alone unit or other system. Thus, two or more concentric streams with different flow characteristics such as total temperature, total pressure, swirl and velocity can be formed within the common flow path 80.

The two or more concentric streams may have different characteristics such as swirl and velocity but operate at a generally common static pressures as they are within the common flow path 80. This "virtual" three-stream approach with the common flow path 80 may be somewhat constrained by restrictions on static pressure and swirl distributions, which may limit, to some degree, the range of flow properties that can be achieved. That is, little to no static pressure difference is generated within the common flow path 80, however the streams do have other different characteristics such as different total temperatures, total pressures, velocities, and different relative swirls such as co-swirled, counter swirled, zero swirl or combinations thereof that provides operational advantages. As defined herein, "virtual" refers to two or more gas streams of different properties such as total temperature and pressure co-flowing down a common duct, but need not be physically separated by a solid wall. While well suited and disclosed within an adaptive engine architecture, for some applications virtual multi-stream approaches employing fixed geometry span-adaptive stators may be advantageous, trading variability and adaptability for reductions in complexity, weight, and cost. In such arrangements, the stator geometry will vary as needed along the span, but such variations will be fixed at time of manufacture.

Figures 5, 6:
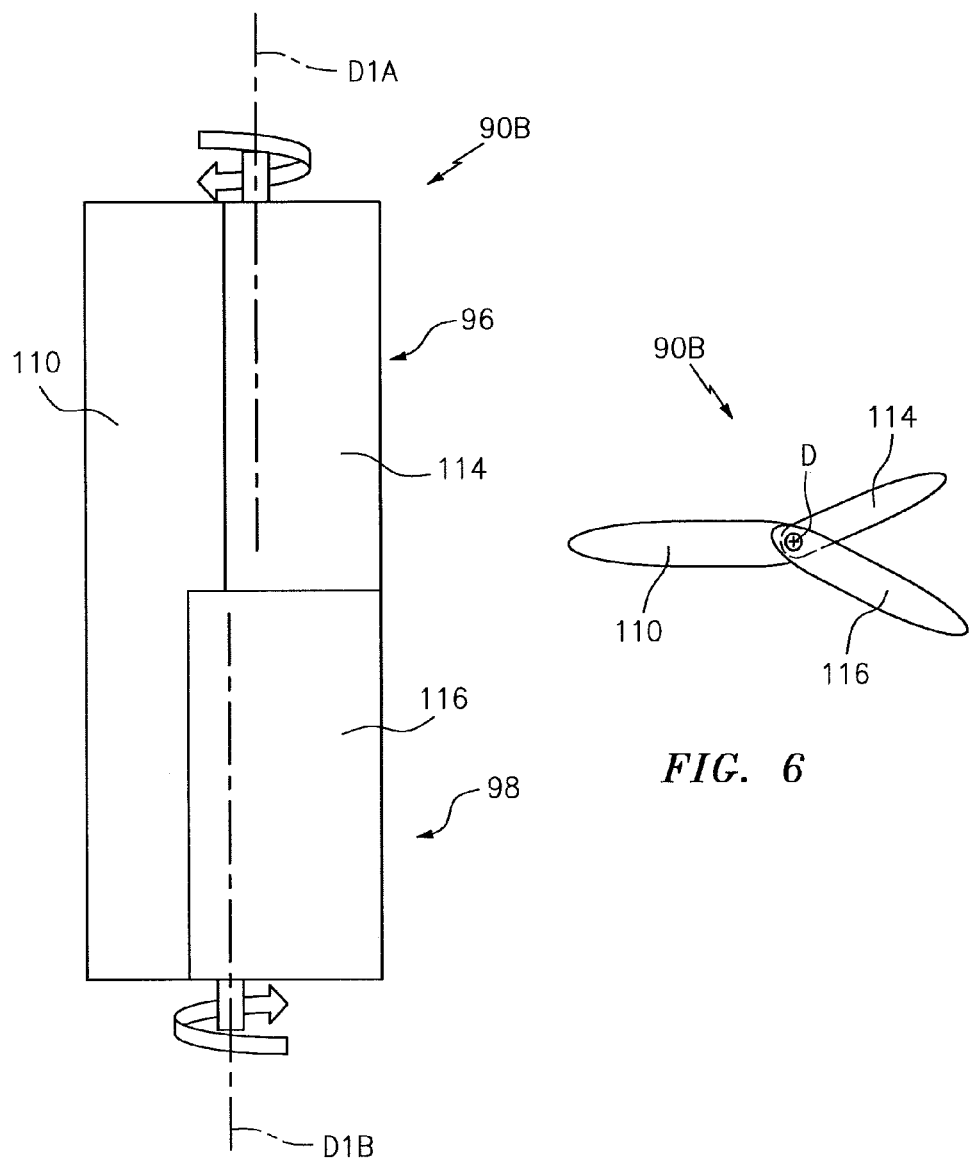
FIG. 5 is an expanded general schematic side view of a span adaptive stator according to another non-limiting embodiment.
FIG. 6 is an top view of the span adaptive stator of FIG. 5.

With reference to FIG. 5, in another disclosed non-limiting embodiment, each of the spanwise segments 96, 98 may include a fixed leading edge segment 110 with a respective trailing edge flap 114, 116. The respective trailing edge flap 114, 116 are individually actuated about a respective axis D1A, D1B (see FIG. 6) as described above to generate the flow streams. It should be appreciated that axis D1A, DB may be coaxial or offset.

Figures 7, 8:
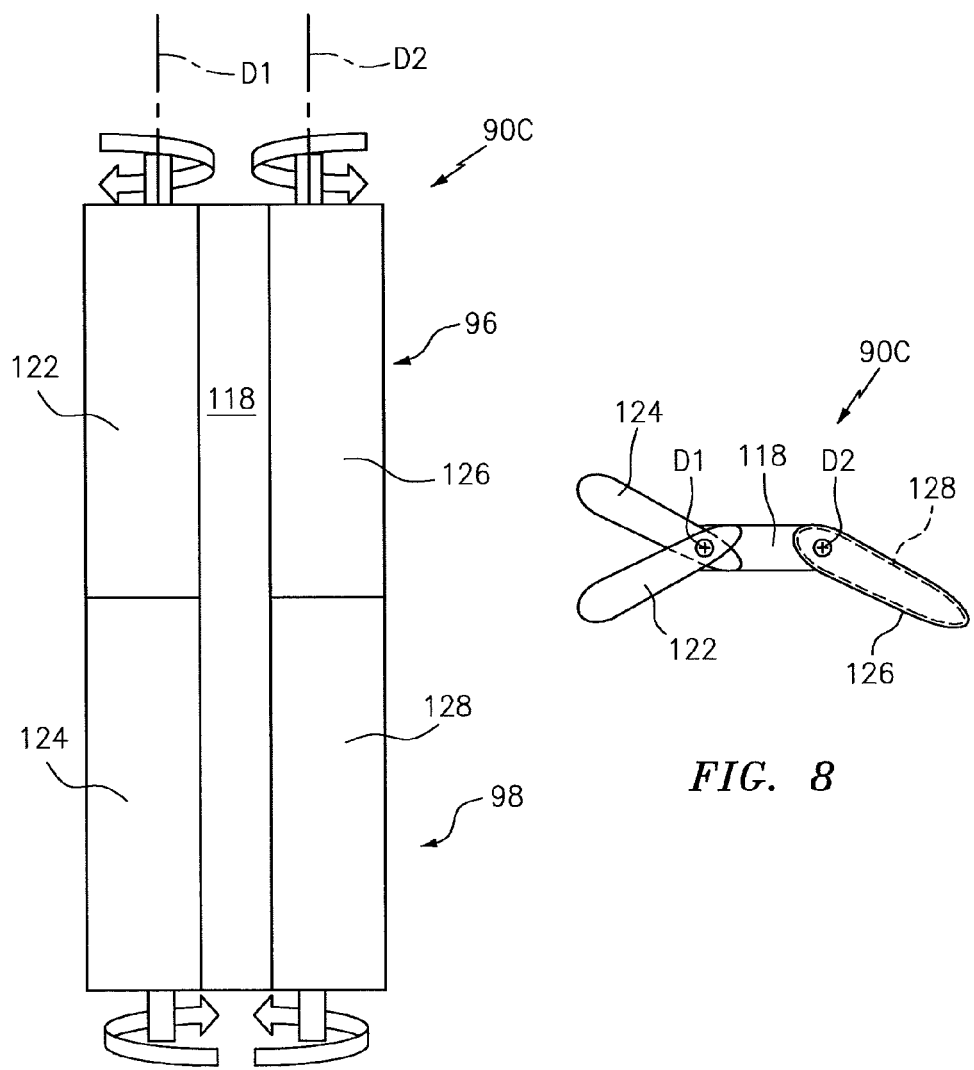
FIG. 7 is an expanded general schematic side view of a span adaptive stator according to another non-limiting embodiment.
FIG. 8 is a top view of the span adaptive stator of FIG. 7.

With reference to FIG. 7, in another disclosed non-limiting embodiment, each of the spanwise segments 96, 98 of the span adaptive stator 90C may include a fixed central segment 118 with a respective leading edge flap 122, 124 and trailing edge flap 126, 128. The leading edge flap 122, 124 and trailing edge flap 126, 128 are individually actuated (see FIG. 8) as described above to generate the two flow streams. Articulation of the leading edge flaps 122, 124 and the trailing edge flaps 126, 128 facilitate further control of the two flow streams.

Figure 9:
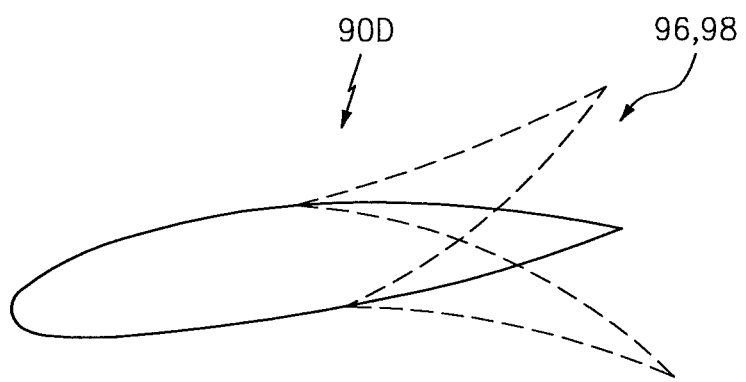
FIG. 9 is a top view of the span adaptive stator according to another non-limiting embodiment.

With reference to FIG. 9, in another disclosed non-limiting embodiment, each segment 96, 98 may be defined by a continuous shape change or morphing span adaptive stator 90D. The continuous shape change or morphing may be achieved, for example, by constructing the skin of the span adaptive stator 90D from a flexible material such as a thin metal sheet that is flexed with an internal mechanical mechanism such as cams or materials which change elongation with temperature change or voltage change. It should be appreciated that while some disclosed non-limiting embodiments disclose a discontinuous geometry along the span of the span adaptive stator, with morphing geometries continuous variation along the span may be realized.

Figure 10:
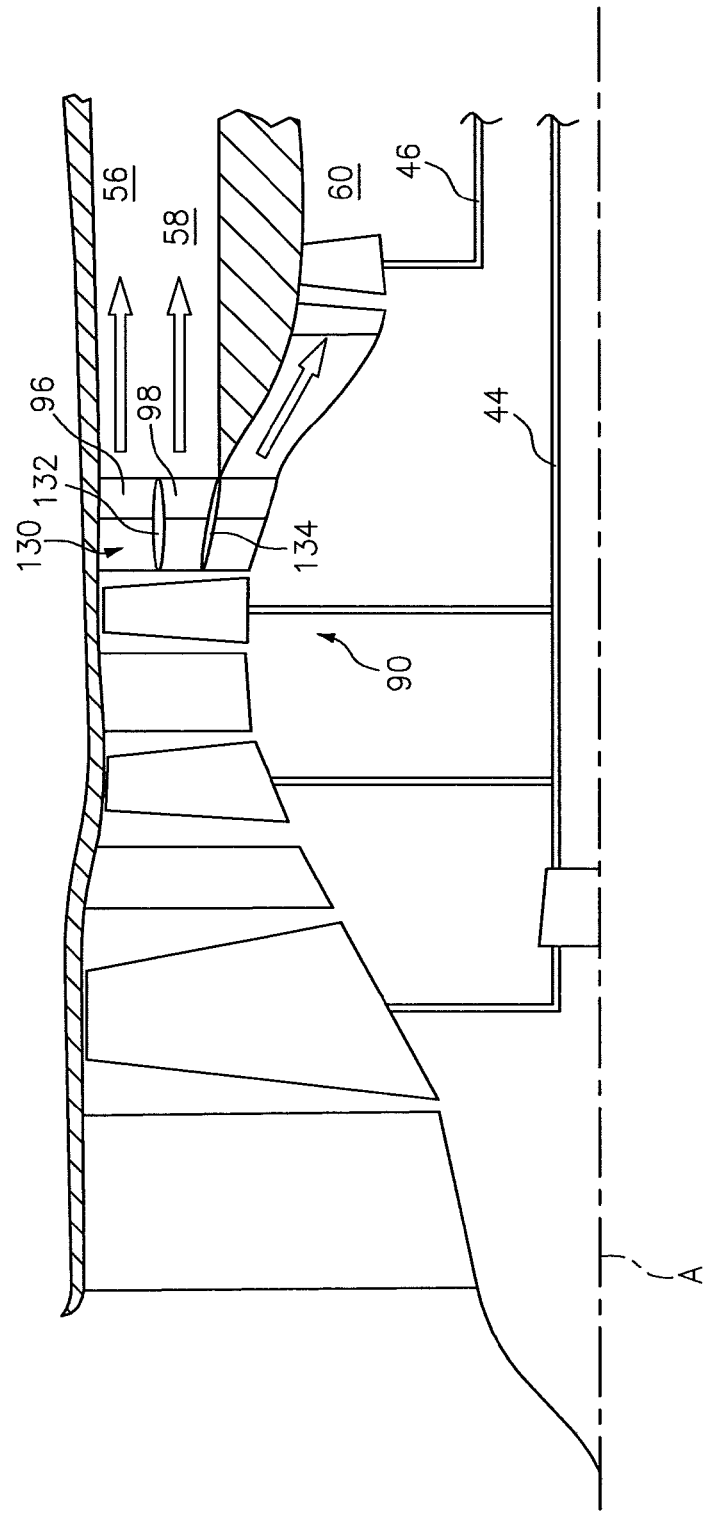
FIG. 10 is an expanded general schematic sectional view of a fan section with span adaptive stators according to another non-limiting embodiment.

With reference to FIG. 10, in another disclosed non-limiting embodiment, a span adaptive stator 130 includes a circumferential partial span shroud 132 located between the spanwise segments 96, 98. The circumferential partial span shroud 132 further facilitates segregation of the second and third streams. The circumferential partial span shroud 132 at least partially forms separate co-annular passageways in the axial position of the span adaptive stator 130. That is, the circumferential partial span shroud 132 physically separates streams for only a discrete axial distance of the circumferential partial span shroud 132. The span adaptive stator 130 may additionally include another circumferential partial span shroud 134 that facilitates segregation of the second stream flow from the core stream flow. These shrouds may extend over all or only part of the airfoil axial chord.

Figure 11:
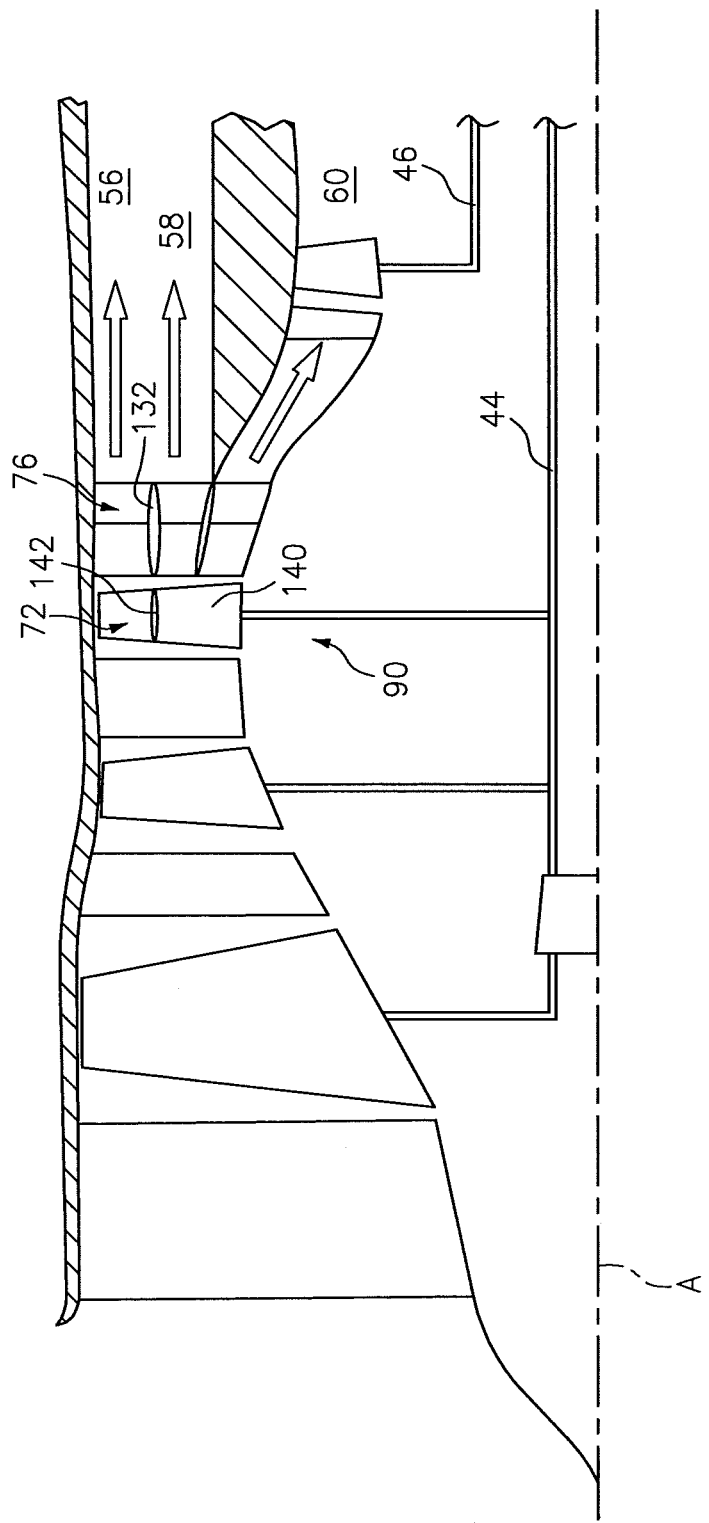
FIG. 11 is an expanded general schematic sectional view of a fan section with span adaptive stators according to another non-limiting embodiment.
Figure 12:
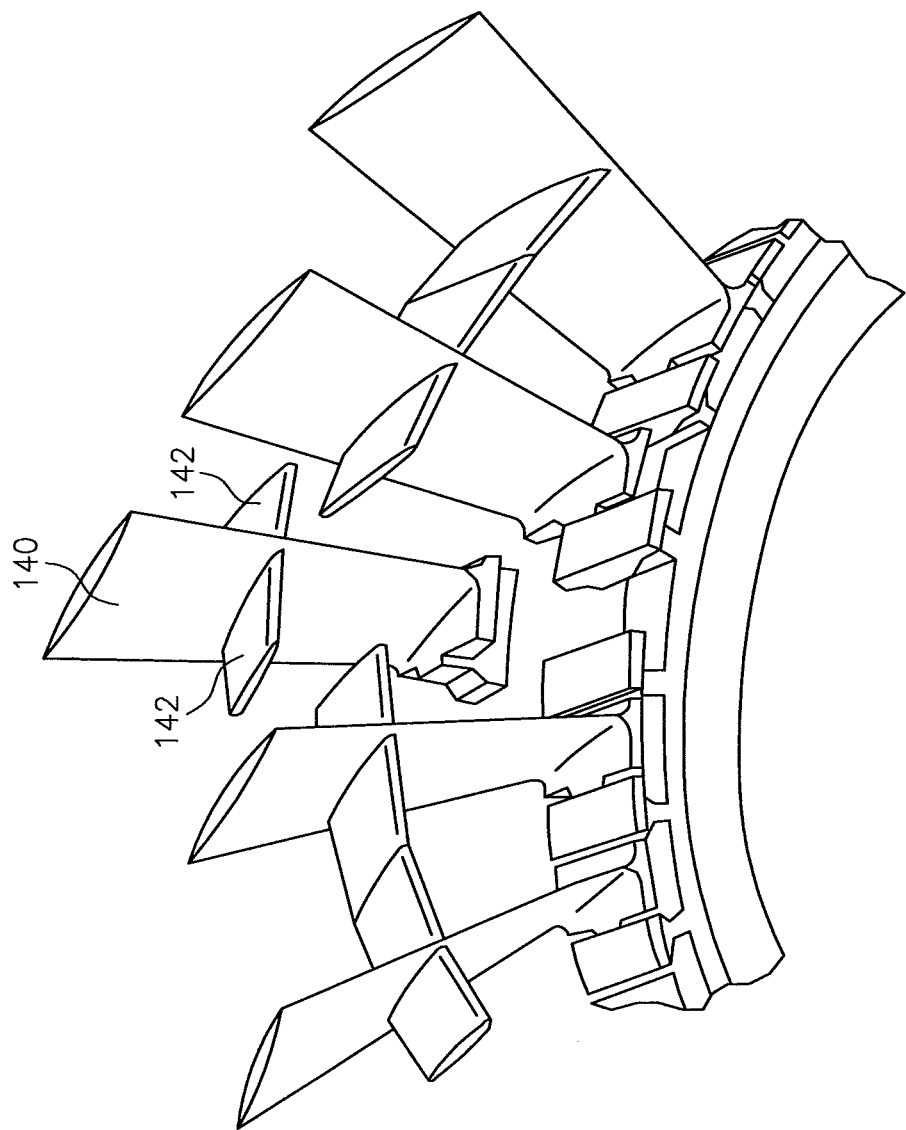
FIG. 12 is a perspective view of a rotor blades according to another non-limiting embodiment

With reference to FIGS. 11 and 12, in another disclosed non-limiting embodiment, the fan rotor 72 immediately upstream of the vane array 76 includes a multiple of blades 140, each with a circumferential partial span blade shroud 142 (also shown in FIG. 12). In one embodiment, the shrouds may be in general arrangement as those used on rotor blades to add mechanical damping. The circumferential partial span blade shrouds 142 are generally radially aligned with the circumferential partial span shroud 132 to at least partially extend the co-annular passageways to further segregate the flow streams. The co-annular passageways thereby extend further forward into the second fan section 26 toward the first fan section 24.

Figure 13:
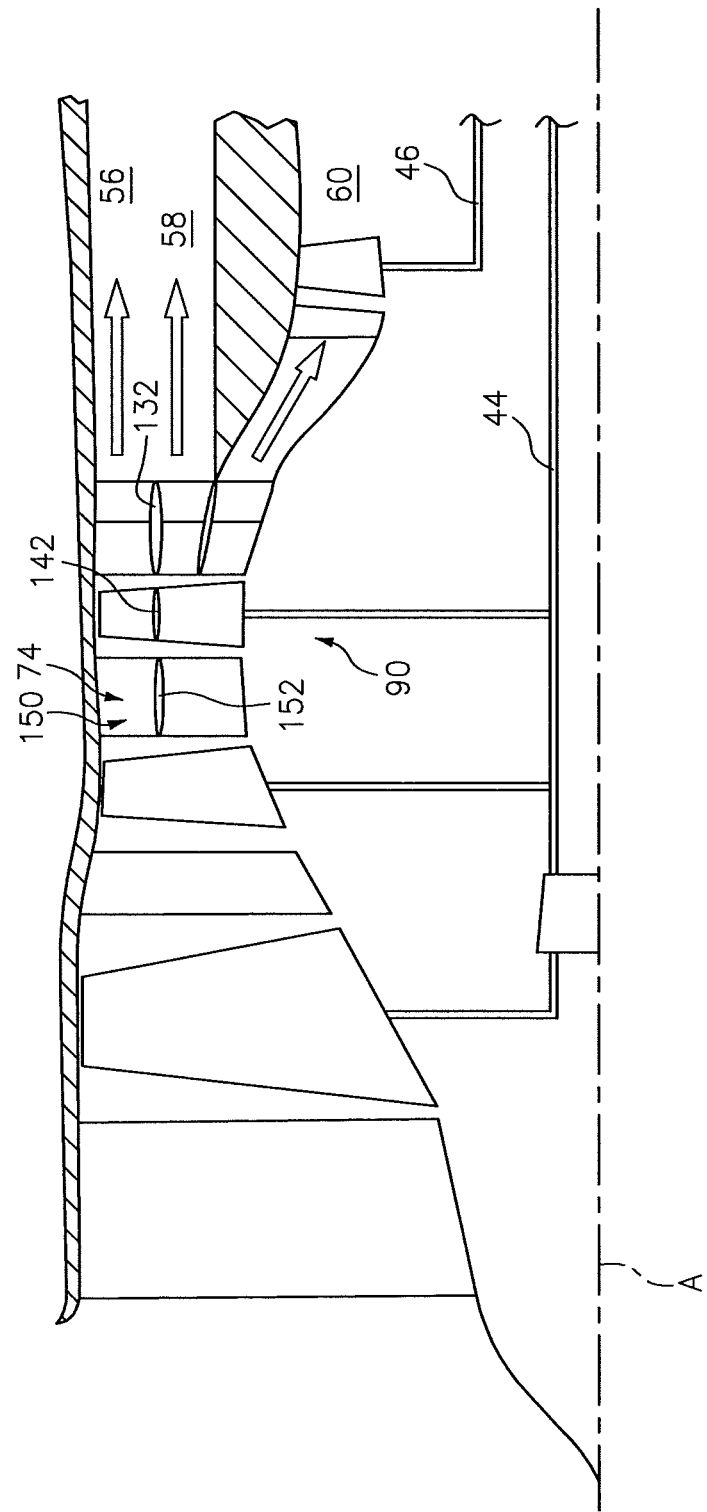
FIG. 13 is an expanded general schematic sectional view of a fan section with span adaptive stators according to another non-limiting embodiment.
Figure 14:
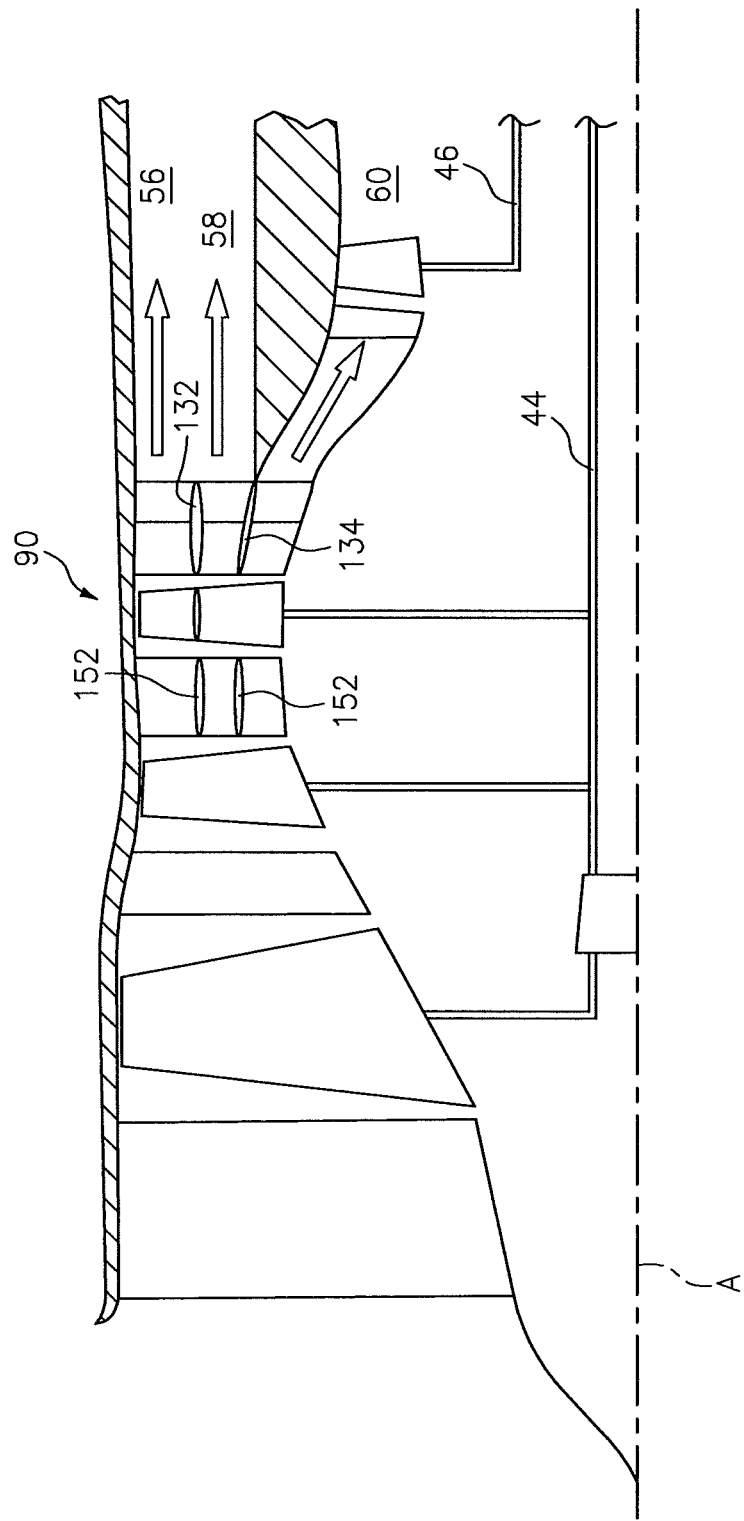
FIG. 14 is an expanded general schematic sectional view of a fan section with span adaptive stators according to another non-limiting embodiment.

With reference to FIG. 13, in another disclosed non-limiting embodiment, the vane array 74 upstream of the fan rotor 72 includes span adaptive stators 150 such as the above-described span adaptive stators 90. Alternatively, or in addition thereto, the vane array 74 may include a multiple of span adaptive stators as above described. The span adaptive stators 150 may include one circumferential partial span vane shrouds 152 or two circumferential partial span vane shrouds 152 (see FIG. 14) which are radially aligned with the respective circumferential partial span shroud 132, 142 and/or the circumferential partial span shroud 134. The circumferential partial span vane shrouds 152 at least partially extend the co-annular passageways that segregate streams further forward into the second fan section 26. It should be appreciated that the second fan section 26 may alternatively or additionally include other architectures that, for example, include additional or fewer stages each with or without various combinations of span adaptive stators with or without circumferential partial span shrouds.

The span adaptive stators 90 alter the airflow direction along the stator span such that, considering the aerodynamic interaction with the rotors, the desired spanwise distribution of total temperature and total pressure is achieved. It will usually be desired that this distribution be one that is stable as it flows through the downstream duct such that the stators are operable to change their shape along the span so that the air entering and exiting the stator row is in the desired direction and velocity. This may be achieved by, for example, changing the shape of the stator by rotating the entire stator segment around a suitable axis in a continuous (morphing) manner, a discontinuous manner (using flaps, either singularly or in combination) or other system such as stator fluid injection for flow control to change the flow direction either alone or in combination with one of the preceding approaches.

The span adaptive stators, with or without circumferential partial span shrouds, facilitate a class of multi-stream engine architectures without the detrimental penalties of increased weight and wall pressure loss associated with inter-stream ducts. This approach may be particularly useful for three-stream architectures for applications where conventional approaches may offer minimal benefits.

It should be understood that relative positional terms such as "forward," "aft," "upper," "lower," "above," "below," and the like are with reference to the engine but should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A gas turbine engine, comprising:
   a fan section;
   a core flow path to direct a core stream flow;
   a common flow path outboard of the core flow path, the common flow path to direct both a second stream flow and a third stream flow, the common flow path at least partially formed between an outer case structure and a case structure; and
   a vane array with a multiple of span adaptive stators operable to separately control the second stream flow and the third stream flow,
   wherein the fan section is immediately upstream of the case structure wherein the case structure separates the common flow path from the core flow path, and wherein the multiple of span adaptive stators are upstream of the common flow path.

2. The gas turbine engine as recited in claim 1, wherein the third stream flow and the second stream flow each operate at a different total temperature, total pressure, and relative velocity, and equivalent static pressure.

3. The gas turbine engine as recited in claim 1, wherein the third stream flow and the second stream flow each operate at equivalent static pressure.

4. The gas turbine engine as recited in claim 1, wherein the third stream flow and the second stream flow each operate at a different relative swirl.

5. The gas turbine engine as recited in claim 1, where each span adaptive stator of the multiple of span adaptive stators includes a first spanwise segment and a second spanwise segment each individually rotatable about an axis.

6. The gas turbine engine as recited in claim 1, where each span adaptive stator of the multiple of span adaptive stators includes a first spanwise segment and a second spanwise segment each with a trailing edge flap rotatable about an axis.

7. The gas turbine engine as recited in claim 1, where each span adaptive stator of the multiple of span adaptive stators includes a first spanwise segment and a second spanwise segment each with a leading edge flap rotatable about an axis.

8. The gas turbine engine as recited in claim 1, where each span adaptive stator of the multiple of span adaptive stators includes a first spanwise segment and a second spanwise segment each with a leading edge flap rotatable about an axis and a trailing edge flap rotatable about an axis.

9. The gas turbine engine as recited in claim 1, where each span adaptive stator of the multiple of span adaptive stators includes a circumferential partial span shroud to at least partially define co-annular passageways between the second stream flow and the third stream flow.

10. The gas turbine engine as recited in claim 9, further comprising a rotor disk with a multiple of rotor blades, each rotor blade of the multiple of rotor blades including a circumferential partial span blade shroud radially aligned with the circumferential partial span shroud.

11. A gas turbine engine, comprising:
a fan section;
an outer case structure around a central longitudinal engine axis;
an intermediate case structure inboard of the outer case structure, the intermediate case structure and the outer case structure to direct a second stream flow and a third stream flow, respectively;
an inner case structure inboard of the intermediate case structure, the inner case structure and the intermediate case structure to direct a core stream flow; and
a vane array with a multiple of span adaptive stators operable to separately control the second stream flow and the third stream flow,
wherein the fan section is immediately upstream of the intermediate case structure,
wherein the intermediate case structure separates the core stream flow from the second stream flow, and
wherein the multiple of span adaptive stators are upstream of a common flow path at least partially formed between the outer case structure and the intermediate case structure, the common flow path to receive both the third stream flow and the second stream flow.

12. The gas turbine engine as recited in claim 11, wherein the inner case structure and the intermediate case structure at least partially form a core flow path inboard of the common flow path, the core flow path to receive the core stream flow.

13. A method of operating a gas turbine engine, comprising:
directing both a third stream flow and a second stream flow from a fan section into a common flow path that is radially outboard of a core flow path; and
separately controlling the second stream flow and the third stream flow using a vane array with a multiple of span adaptive stators,
wherein the fan section is immediately upstream of a case structure that separates the common flow path from the core flow path,
wherein the multiple of span adaptive stators are upstream of the common flow path, and
wherein the common flow path is at least partially formed between an outer case structure and the case structure.

14. The method as recited in claim 13, further comprising at least partially segregating the third stream flow and the second stream flow with a circumferential partial span shroud that extends from the multiple of span adaptive stators.

15. The method as recited in claim 14, further comprising at least partially segregating the third stream flow and the second stream flow with a circumferential partial span blade shroud that extends from each rotor blade of a multiple of rotor blades upstream of the circumferential partial span shroud, the circumferential partial span blade shroud radially aligned with the circumferential partial span shroud.

16. The method as recited in claim 13, further comprising at least partially forming the third stream flow and the second stream flow by morphing at least one span adaptive stator of the multiple of span adaptive stators.

17. The method as recited in claim 13, wherein the third stream flow and the second stream flow operate at a different total temperature, total pressure, and relative velocity, and an equivalent static pressure.

* * * * *